United States Patent [19]

Kuenzly

[11] Patent Number: 4,800,825
[45] Date of Patent: Jan. 31, 1989

[54] SLAGGING-COMBUSTOR SULFUR REMOVAL PROCESS AND APPARATUS

[75] Inventor: John D. Kuenzly, Redondo Beach, Calif.

[73] Assignee: TRW Inc., Redondo Beach, Calif.

[21] Appl. No.: 161,291

[22] Filed: Feb. 24, 1988

Related U.S. Application Data

[63] Continuation of Ser. No. 93,064, Aug. 31, 1987, abandoned, which is a continuation of Ser. No. 670,411, Nov. 13, 1984, abandoned.

[51] Int. Cl.$^4$ .................................................. F23J 7/00
[52] U.S. Cl. .................................. 110/345; 110/230; 110/264; 110/265; 110/347
[58] Field of Search ................................ 110/342–345, 110/347, 104 R, 218, 230, 263–266; 431/4, 8–10, 173

[56] References Cited

U.S. PATENT DOCUMENTS

| | | | |
|---|---|---|---|
| 2,516,141 | 7/1950 | Newman et al. | 48/203 |
| 2,971,480 | 2/1961 | Sage | 110/265 |
| 3,124,086 | 3/1964 | Sage et al. | 110/7 |
| 3,250,236 | 5/1966 | Zelinski | 110/28 |
| 3,357,383 | 12/1967 | Golovanov et al. | 110/28 |
| 3,358,624 | 12/1967 | Way | 110/22 |
| 3,540,387 | 11/1978 | McLaren et al. | 110/1 |
| 3,693,557 | 9/1972 | Makuch | 110/1 J |
| 3,717,700 | 2/1973 | Robinson et al. | 110/1 J |
| 3,966,431 | 6/1976 | Craig et al. | 122/4 D X |
| 4,022,591 | 5/1977 | Staudinger | 110/263 X |
| 4,111,755 | 9/1978 | Beni et al. | 110/345 X |
| 4,147,116 | 4/1979 | Graybill | 110/263 |
| 4,235,585 | 11/1980 | Anderson | 431/4 X |
| 4,285,283 | 8/1987 | Lyon et al. | 110/342 |
| 4,311,638 | 5/1982 | Michelfelder | 431/4 X |
| 4,346,064 | 8/1982 | Leon | 110/345 X |
| 4,377,118 | 3/1983 | Sadowski | 110/343 |
| 4,381,718 | 5/1983 | Carver et al. | 110/347 |
| 4,395,975 | 8/1983 | Ashworth et al. | 110/229 X |
| 4,423,702 | 1/1984 | Ashworth et al. | 110/229 X |
| 4,424,765 | 1/1984 | Strohmeyer, Jr. | 122/4 D X |
| 4,458,606 | 7/1984 | Merrell | 110/343 |
| 4,469,032 | 9/1984 | Yan | 110/342 |

(List continued on next page.)

OTHER PUBLICATIONS

CONOCO Technical Bulletin, TB 1/84 BJK, "Boiler Limestone Injection Technology for SO$_2$ Abatement."
Freund et al., Combustion and Flame, "The Sulfur Retention of Calcium-Containing Coal During Fuel--Rich Combustion" 45: 191–203 (1982).
Freund, Combustion Science and Technology, "The Kinetics of Limestone/Dolomite with H$_2$S under Rich Combustion Conditions", 1981, vol. 26, pp. 83–88.
Jensen et al., ACS Symposium Series, No. 196, Chemical Reaction Engineering—Boston, pp. 335–346, Wei et al., Editors (1982).
VGB Kraftwerkstechnik 66 (VGB Power Plant Engineering), vol. 7, Jul. 1986, pp. 637–645.
Frey, TRW Coal Combuster NO$_x$ Emissions, TRW, Inc., Mar. 25, 1987, 27 pages.

Primary Examiner—Steven E. Warner
Attorney, Agent, or Firm—Shlomo R. Freiman; Benjamin DeWitt

[57] ABSTRACT

In the operation of a slagging combustor, including an apertured baffle defining part of a cylindrical combustion chamber having a head end which includes a nozzle for injection of sulfur-containing particulate carbonaceous material to be combusted in a whirling oxidant flow field, there is injected a particulate sulfur sorbent at the aperture of the baffle towards the nozzle to react with released sulfur. The sulfur sorbent is injected into the combustion zone from a location near the exit end thereof. Fuel is injected near the center of the head end. A relatively fuel-rich recirculation zone is established and maintained along the longitudinal axis of the combustion chamber surrounded by a relatively oxygen-rich annular region. Sorbent mixes intimately with, and flows co-currently with, recirculating gases, generally toward the head end of the combustion zone, whereby the mixture of sorbent and gaseous products of combustion are maintained at temperatures and stoichiometric conditions favoring conversion of sulfur to compounds that dissolve in the molten slag.

12 Claims, 5 Drawing Sheets

U.S. PATENT DOCUMENTS

| | | | |
|---|---|---|---|
| 4,481,892 | 11/1984 | Mah | 110/263 |
| 4,498,402 | 2/1965 | Kober et al. | 110/345 |
| 4,500,281 | 2/1985 | Beardmore | 431/3 |
| 4,507,075 | 3/1985 | Buss et al. | 431/173 X |
| 4,514,256 | 4/1985 | Kober et al. | 110/343 X |
| 4,517,904 | 5/1985 | Penterson et al. | 110/264 |
| 4,542,704 | 9/1985 | Brown et al. | 110/347 |
| 4,555,392 | 11/1985 | Steinberg | 110/343 X |
| 4,561,364 | 12/1985 | Green et al. | 110/347 |
| 4,566,392 | 1/1986 | Ishihara | 110/264 X |
| 4,582,005 | 4/1986 | Brown | 110/347 |
| 4,586,443 | 5/1986 | Burge et al. | 110/347 |
| 4,613,487 | 9/1986 | Yoon et al. | 110/343 X |
| 4,651,653 | 3/1987 | Anderson et al. | 110/234 |
| 4,655,148 | 4/1987 | Winship | 110/347 |
| 4,660,478 | 4/1987 | Sheppard et al. | 110/264 |
| 4,685,404 | 8/1987 | Sheppard et al. | 110/265 |

KENTUCKY COAL

SOx REDUCTION TEST RESULTS

SLAGGING-COMBUSTOR SULFUR REMOVAL PROCESS AND APPARATUS

This application is a continuation of application Ser. No. 093,064, filed Aug. 31, 1987, now abandoned, which is a continuation of application Ser. No. 670,411, filed Nov. 13, 1984, now abandoned.

BACKGROUND OF THE INVENTION

U.S. Pat. No. 4,217,132 to Burge et al, incorporated herein by reference, describes a method and apparatus for in-flight combustion of carbonaceous fuel in a manner and under conditions such that substantially all slag is removed from the gaseous products of combustion. In the system described therein, a carbonaceous fuel, such as particulate coal, fluidized by a carrier fluid is injected into a swirling combustion zone into which oxidizer, typically air, is introduced tangentially to aid in maintaining swirling conditions. Combustion occurs with formation of slag. Slag centrifugally accumulates along the interior walls of the combustion chamber and flows to a baffle where the slag is collected and removed to a slag-disposal subsystem. Slag serves as an insulating layer to protect the materials forming the walls of the combustor. The slag primarily consists of noncombustible minerals contained in the coal and is essentially carbon-free. The gaseous product of the slagging combustor may, for instance, be introduced with additional oxygen to a secondary combustion system for the generation of thermal energy.

Most coal contains substantial amounts of sulfur some of which is organically bound with the carbon, and some present in the form of metal sulfides and sulfates Societal considerations, including current clean-air regulations, dictate reduction of sulfur oxide emissions to concentrations lower than heretofore readily achievable in high power density coal combustion. As disclosed at column 4, lines 51 et seq. of the patent, the problem of removal of the oxides of sulfur was addressed. There, it was stated that to control sulfur oxide emissions, treatment chemicals such as carbonates may be added to the input fuel, or introduced separately to the reaction chamber.

SUMMARY OF THE INVENTION

When coal is burned, various forms of sulfur are also oxidized, and forms of sulfur are also oxidized, and tend to be emitted with the exhaust gases as sulfur oxides. In that portion of my combustion process in which less than sufficient oxidizer is present to fully combust the coal, the sulfur will tend to remain in a reduced form such as hydrogen sulfide, or metal sulfides. This reduced form of sulfur is advantageous for reaction with a sorbent. The present invention takes advantage of this.

Disclosed is a process and apparatus for high power density combustion of carbonaceous fuel (e.g. coal) in which particulate fuel, entrained in a flow of carrier fluid, and oxidizer gas are separately injected into a combustion zone and intensely reacted to produce thermal energy and heated products of combustion including molten slag and gaseous products. Combustion conditions are regulated to maintain combustion temperatures within a desired range and to minimize the carry over of volatilized and/or liquid slag in the output gaseous products More specifically, the oxidizer and fuel input velocities and mass-flow rates are regulated so as to maintain a relatively oxygen-rich annular region adjacent the substantially-cylindrical side walls of the combustion chamber and a relatively fuel-rich core portion within said annular zone. In this core portion, gaseous products of combustion are caused to recirculate forwardly along the axis of the chamber from a location near the exit end and generally toward the end of the chamber where fuel and oxidizer are injected A sulfur-sorbent material, such as limestone and/or dolomite, is injected longitudinally into the relatively fuel-rich core portion of the combustion zone so that it mixes intimately with sulfur-containing constituents of the gaseous products of combustion flowing in said core portion; the sulfur-sorbent material reacts with sulfur compounds under temperature and stoichiometric conditions that are favorable to the formation of selected sulfur compounds, such as calcium sulfide. These compounds are selected for high solubility in molten-slag droplets circulating in the combustion zone and in the molten-slag layer along the walls of the chamber. Moreover, these sulfur compounds are normally in a liquid state at the temperatures maintained in the combustion zone and, therefore, sulfur-compound droplets and slag are centrifugally driven to the side walls of the combustion chamber, by the high-velocity, whirling flow fields extant therein. Thus, sulfur derived from the fuel is converted to compounds which may be, and largely are, separated from the gaseous products of combustion before these gaseous products leave the combustion zone. Moreover, these sulfur compounds are accelerated, centrifugally, from the fuel-rich portion, through the relatively oxidizer-rich region before they have residence time sufficient to be oxidized. The resultant sulfur compounds become inextricably held in the liquid slag, which is drained from the combustion chamber to a subsystem for collecting, solidifying and disposing of the slag. A significant advantage of the described process and apparatus is that the solidified slag may be removed in the form of a gravel-like, coarse particulate from which the sulfur compounds are not easily leached. Accordingly, this gravel-like slag may be disposed of with substantially reduced risk of air or water pollution.

DETAILED DESCRIPTION

The present invention relates to improvements in methods and apparatus for efficiently combusting particulate carbonaceous materials and, simultaneously with such combustion, removing a preponderance of the fuel's sulfur from the gaseous products of combustion. Basic to the system is the use of combustion methods and several subsystems, which, in cooperation, enable particulate carbonaceous materials to be combined with preheated oxidant, typically air, under conditions where essentially-spontaneous ignition occurs and combustion continues in fluid dynamic flow fields having temperature and stoichiometric characteristics that favor certain selected chemical reactions useful in removing sulfur compounds. More specifically, the present invention resides in an improved slagging combustion process and apparatus wherein sulfurous constituents of the carbonaceous fuel are reacted with sulfur-sorbent additives in a relatively fuel-rich portion of the combustion zone thereby removing sulfur compounds from the gaseous products of combustion and converting them to relatively stable compositions that are readily absorbed by, and removed with, the molten slag. In slagging combustors of this general type it is usual to flow the molten slag to a water-filled slag tank where it fractures, by thermal-shock, to form a granular waste. A significant aspect of the present invention is that most of the sulfur content of the fuel is dissolved in and/or mechanically captured in the liquid slag and the slag is converted to a gravel like aggregation of lump, nuggets and granules. Because reaction-end sulfur compounds are trapped in the solidified slag, the solidified-slag waste may be disposed with substantially reduced risk of releasing sulfur compounds to the environment.

A. The Slagging Combustion System

Figure 1:
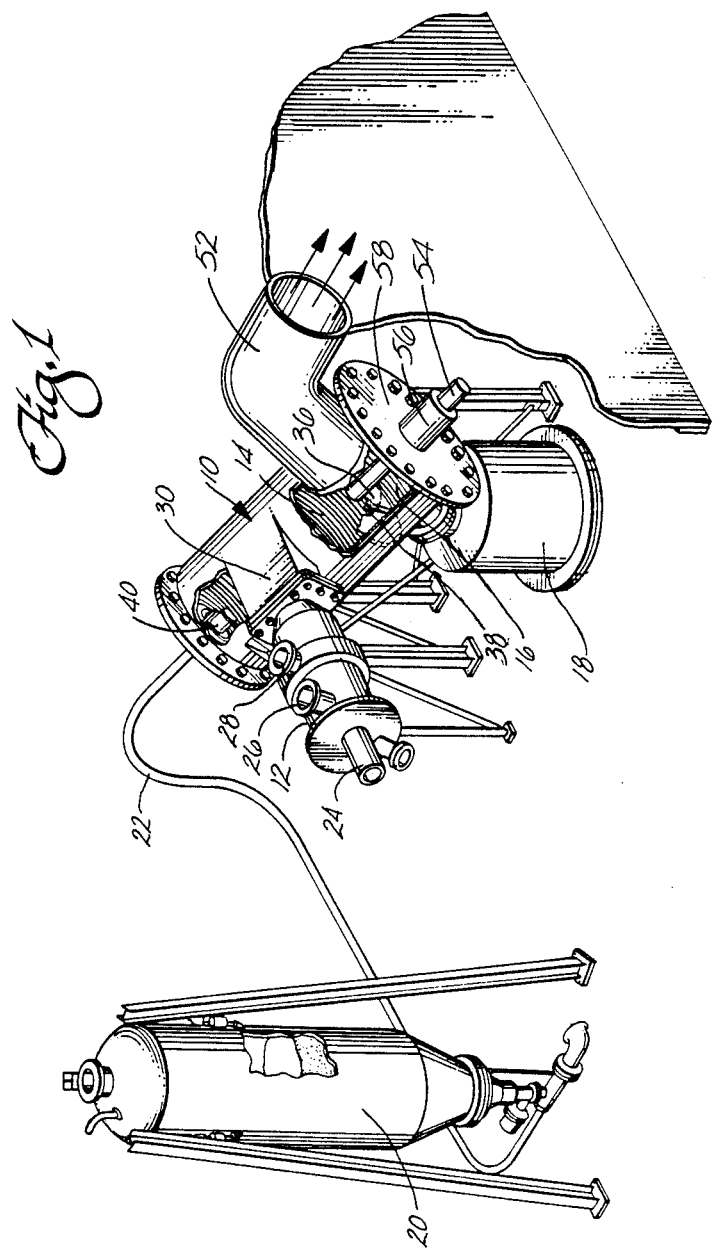
FIG. 1 is a perspective illustration of a slagging combustion system constructed and arranged to feed an effluent-consuming furnace.
Figure 2:
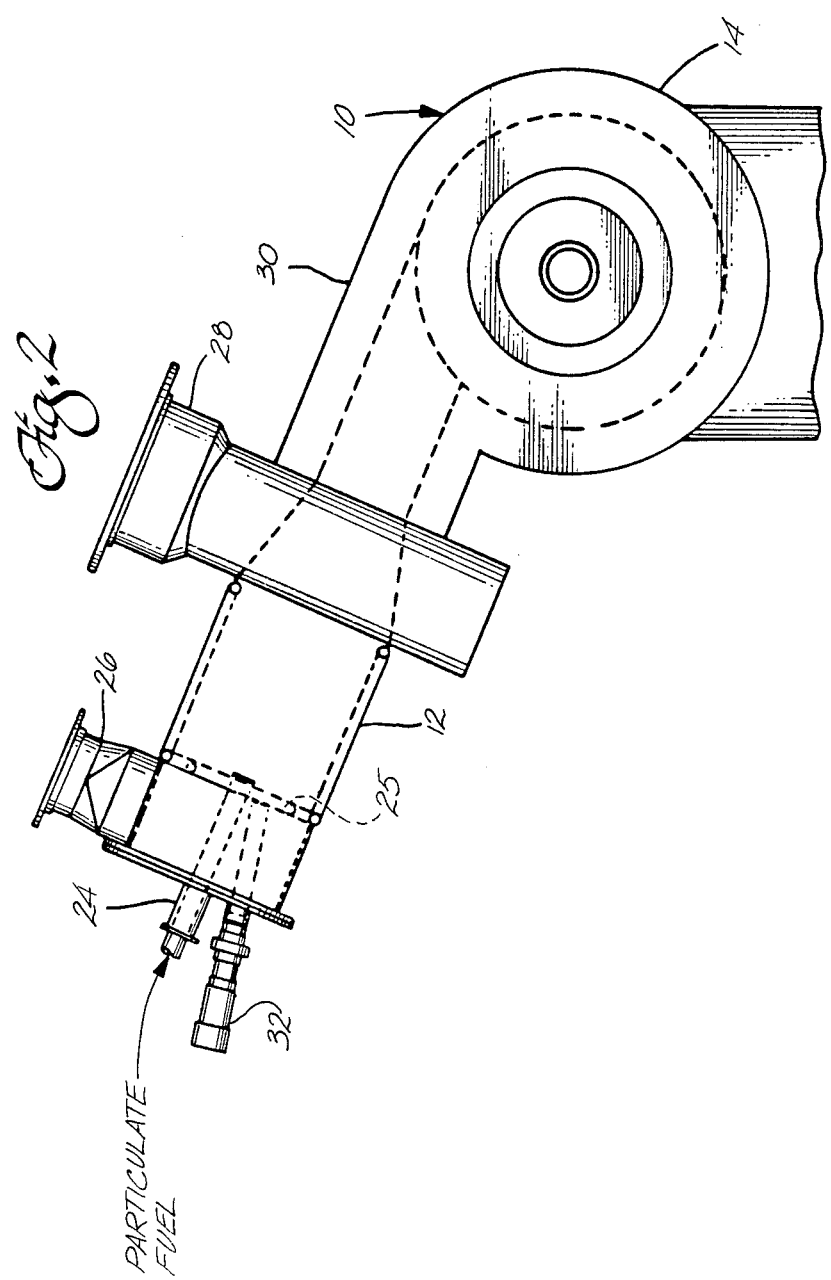
FIG. 2 illustrates the precombustor of the slagging combustion system.
Figure 3:
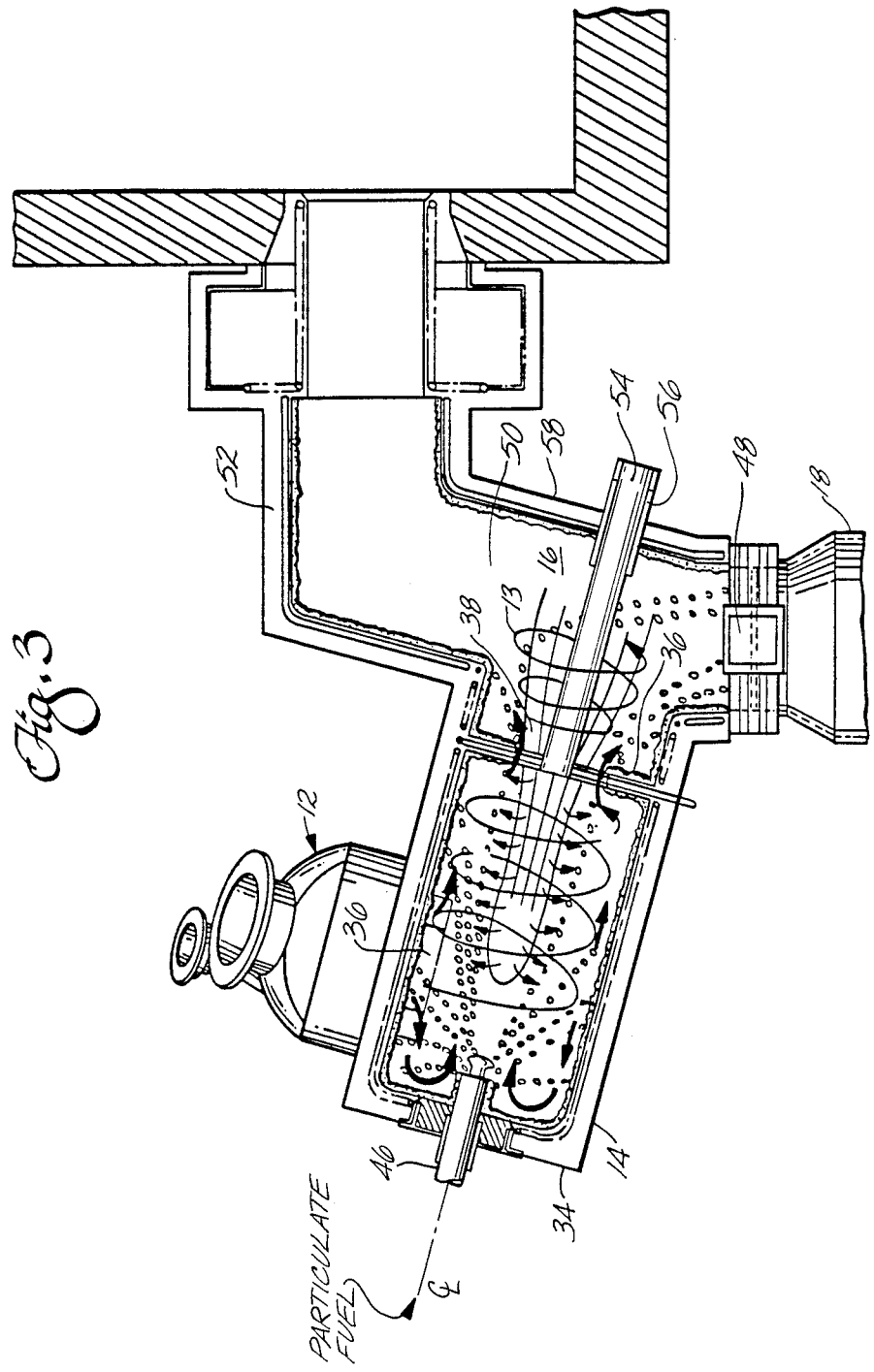
FIG. 3 illustrates the primary combustor and its accessories and subsystems.

With reference first to FIGS. 1, 2, and 3 the slagging combustion system 10 comprises a precombustion chamber 12, primary combustion chamber 14, and slag-recovery chamber 16 with which slag collection unit 18 is associated. As shown in FIG. 1, the bulk of the particulate carbonaceous fuel to be consumed, is supplied from reservoir 20 by line 22 to primary combustion chamber 14. The balance, usually from about 10% to about 25% of the total feed, is fed to precombustion chamber 12.

The presently preferred structures for the three chambers 12, 14 and 16 are detailed with particular reference to FIGS. 2 and 3.

The function of chamber 12 is to condition the oxidant, normally air, for feed to primary combustion chamber 1, where the primary feed of particulate carbonaceous material is combusted under substoichiometric, slag-forming conditions.

By the term "particulate carbonaceous material" as used herein, there is meant carbon-containing substances which can be provided as a fuel source in a dispersed fluid. Representative carbonaceous materials include, among others, coal, char, the organic residue of solid-waste recovery operations, tarry oils which are dispersible in a carrier fluid which can be a gas or a liquid. Essentially, all that is required is that the carbonaceous material to be used be amenable to fluidized transport in a carrier fluid, which may be a liquid or a carrier gas, e.g., air. The most typical form in which the carbonaceous material is provided is that of coal, and the invention will be described in detail in terms of the combustion of coal.

By the term "oxidant" as used herein, there is meant a gaseous source of oxygen, preferably air or oxygen-enriched air.

Preconditioning of the oxidant is achieved in precombustion chamber 12, ideally of cylindrical geometry, to which first-stage oxidant is fed by way of inlet 26 to combine with that portion of the particulate fuel being fed to the precombustion chamber through nozzle assembly 24. The fuel introduced to nozzle assembly 24 and the oxidant, in an amount required for substantially stoichiometric conversion of the fuel introduced by nozzle assembly 24, are reacted to yield a gas of high temperature, e.g., about 3000° F or more.

A second portion of the oxidant feed to the precombustor is introduced through concentric plenum conduits 28 of precombustor 12. The oxidant mixes with the reaction products. This produces a hot, (from about 1200° to 1800° F.) oxidant-rich gas stream which is directed through a rectangular exit conduit 30.

The heated oxidant and reaction products generated in the precombustion chamber 12, move through exit 30 tangentially into primary combustor 14, which is preferably of cylindrical geometry. The oxidant and reaction products from the precombustor 12 not only cause a whirling motion of the flow field within primary chamber 14, but, as shown in FIG. 3, the oxidant and reaction products flowing from the precombustor apparatus divide into two substantially high-velocity streams, with one stream flowing spirally along the wall towards head end 34 of primary combustor 14, and the other whirling in a high velocity helical path along the wall of the primary combustor toward apertured baffle 36. The first stream is turned inward at head end 34, and flows helically back toward the apertured baffle 36. This baffle 36 of the primary combustor is a fluid-cooled plate located perpendicular to the centerline of the primary combustor and having a generally centrally-located aperture 38, with the diameter of the aperture being at least about 50% of the internal diameter of the primary combustor.

As noted hereinabove, a major part of the carbonaceous fuel is introduced into primary combustor 14 at head end 34, through centrally-located fuel injector 40, which is positioned substantially along the centerline of primary combustor 14. Fuel injector 40, described in detail below, sprays the carbonaceous fuel into the combustion zone in a substantially conical pattern, into the generally whirling gas flow field, at a net angle of from about 45 degrees to about 90 degrees with respect to the centerline of chamber 14. The nozzle 40 protrudes into primary combustor 14 from head end 34 to a point slightly upstream of the head-end edge of precombustor exit 30.

That portion of the precombustor oxidant and reaction product which flows towards head end 34 of primary combustor 14, provides an initial ignition and fuel-rich reaction zone. As illustrated in FIG. 3, the whirling flow field, as well as the conical injection pattern, causes the now-burning fuel to move in a generally outward path towards the wall of chamber 14. The bulk of the combustibles are consumed in flight through the heated oxidant flow field, giving up energy in the form of heat of reaction and further heating the resultant reaction products and local residual oxidant. The solid carbonaceous particles in free flight also are given an axial component of motion towards the exit of primary combustor 14, such axial motion being imparted by the return axial flow of the head-end oxidant. In operation, essentially all of the carbon contained in the fuel is converted, in flight, to oxides of carbon before the fuel particles reach the walls or exit from chamber 14. Little unburned carbon reaches the chamber's walls; and, therefore, the system tends to maintain a relatively oxygen-rich annular zone adjacent the cylindrical walls. The whirling flow field centrifugally carries the molten noncombustibles, i.e. slag, to the wall of the primary combustor.

Fuel-rich gases generated in the head end of the primary combustor, generally flow towards exit baffle 36 of the primary combustor while the whirling motion is maintained, and mix with oxidant entering from conduit 30. Typical bulk, average, axial-flow velocities are from about 80 to about 100 fps. The internal flow, mixing, and reaction are further enhanced in chamber 14 by a strong recirculation flow along the centerline of primary combustor 14, the flow moving from the center of the baffle aperture 38 towards head end 34 of primary combustor 14, and forming a fuel-rich core portion in the combustion zone, peripherally surrounded by the relatively oxygen-rich annular zone, described above. This core-portion flow is controlled by the precombustor exit flow velocity and selection of the diameter of central aperture 38. Preferably, precombustor exit velocity is about 330 fps, and a preferred baffle-opening-diameter to primary-chamber-diameter ratio of approximately 0.5 produces ideal secondary recirculation flows for enhanced control of ignition and overall combustion within primary chamber 14.

As indicated, the stoichiometry of the primary combustor is selected to be from about 0.7 to about 0.9, preferably from about 0.7 to about 0.8. With the stoichiometry maintained within these ranges, the fuel-rich hot gases are sufficiently hot to produce molten slag at a temperature sufficiently above the slag's fusion temperature so that the slag will flow freely along the walls of primary combustor 14 normally maintained at a temperature of from about 400° F. to about 600° F. The temperature is not so high, however, that significant amounts of the preferred sulfur compounds will be decomposed or oxidized to $SO_2$ out as a vapor component of the gaseous product.

The internal primary combustor slag-flow pattern is driven by the aerodynamic shear forces of the whirling and axial flow gases, and gravity. By tilting the primary combustor at an angle of approximately 15° with respect to horizontal, a satisfactory slag flow occurs within the primary reactor 14, and the molten slag flows out of chamber 14, by way of a keyhole-like aperture in exit baffle 36, to slag-recovery plenum 16 and, thence, to the slag collection and disposal subsystem 18.

Providing a primary combustor length-to-diameter ratio of, nominally, 1.5:1 to 2:1; a baffle diameter-to-primary chamber-diameter ratio of 0.5 to 1.0; and with essentially full, free-flight burning of, nominally, 80% smaller than 200-mesh coals, as described herein, substantially no unburned carbon is carried out in the gaseous product. Further, excellent wall-slag-layer flow and heat-transfer protection are achieved.

From primary combustor 14, the gaseous reaction products flow into slag-recovery plenum 16, with which is associated slag-recovery system 18. At the bottom of chamber 16 is slag-tapping aperture 48 and at its top is an aperture 50, with a transition flow passage arranged at substantially a 90° angle the centerline of chamber 16. From this aperture at the top of chamber 16 extends exit duct 52 to carry the fuel-rich gases on to their ultimate use. This duct leaves chamber 16 on an angle close to vertical, and normally extends for approximately one to two length-to-diameter ratios, one having been found to be adequate, before turning the exit gas flow horizontally towards its ultimate use.

The body of gaseous combustion products in slag-recovery chamber 16 provides the source of the hot recirculation gases which flow up the centerline of the primary combustor 14 into the core portion of the primary combustion zone. The diameter of this core portion is on the order of from 70% to 75% of the diameter of aperture 38 of the baffle plate.

In the foregoing paragraphs, the detailed description of the apparatus shown in FIGS. 2 and 3 has been limited to those parts of the system whose structure and operational parameters need to be understood in order to achieve a full appreciation of the present invention. Other aspects, details and features of the apparatus are described more particularly in copending patent application Ser. No. 670,417 Docket 31-0155, filed concurrently herewith and assigned to the assignee of this invention which has been abandoned in favor of copending patent application Ser. No. 788,929. The specification of the above - identified copending application is incorporated herein by reference.

B. Sulfur Recovery

With further reference to FIG. 3, there is provided, in accordance with the instant invention, a sorbent injector 54, which is inserted in sleeve 56 of rear wall 58, sealed by a gland seal, not shown, and axially extending to approximately the longitudinal position of orifice 38 of baffle 36. Injector 54, which serves to inject a particulate sorbent or sulfur accept or of a size of from about 5 to about 50 microns, preferably is aligned with the longitudinal axis of chamber 14 and, therefore, operates to inject sorbent, co-currently with the recirculation gases, into the core portion of the combustion zone. Alternatively, injector 54 may be mounted through the side wall of primary chamber, as depicted in FIG. 1.

Figure 4:
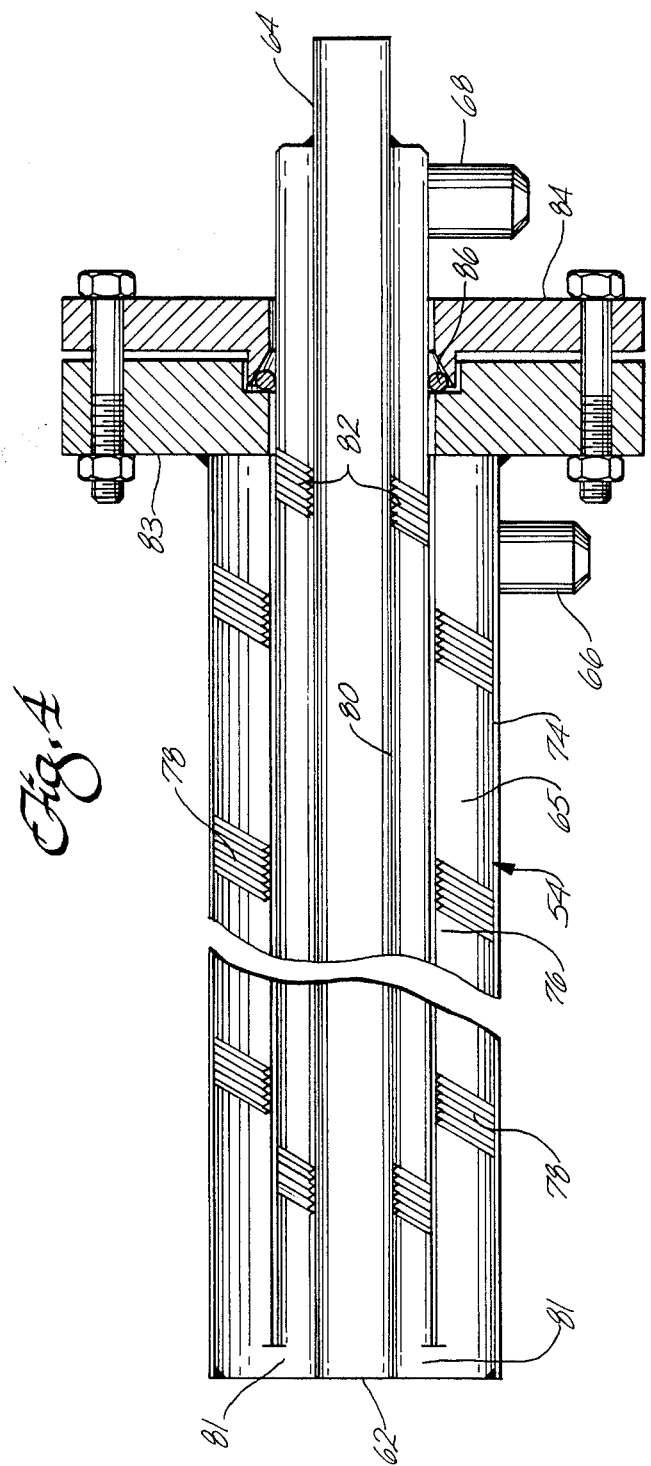
FIG. 4 illustrates in detail a sorbent injector suitable for use in the apparatus of FIG. 3.

FIG. 4 illustrates the injector in longitudinal cross-section. Sorbent outlet 62, at the terminus of conduit 64, carries the sorbent into primary combustion zone 14. The sorbent is fed through a water-cooled annular heat exchanger 65, having a water inlet 66 and a water outlet 68. Flow of water within the heat exchanger is from inlet 66 along the annulus formed of conduits 74 and 76 held in spaced relation by spacer alignment fins 78, through passageway 81 and back through the annulus formed by conduits 76 and 80, held in spaced relation by fins 82. Plate 83 is secured to plate 84 by bolts to compress O-ring packing 86, to seal against leakage.

The temperature at which reaction will occur in primary combustor 14, is dependent on the type of coal to be burned and its ash-fusion temperature. Western U.S. coals provide a combustion chamber operating temperature of about 2500° F. or more, and eastern coals about 2500° to 3200° F, under flowing slag conditions. Particle through-out time for a typical commercially-sized primary chamber 14 is from about 50 to about 200 milliseconds. The rate of flow of sorbent is sufficient to provide a round-trip, i.e., from sorbent injector 54 to the vicinity of fuel injector 40 and back again, to be completed in about 200 milliseconds, during which the sorbent reacts with sulfur containing constituents of the fuel, the metal cation of the sorbent forming a compound with sulfur, and with at least a substantial portion of the resulting sulfur compound being taken up by molten slag. For calcium carbonate, a preferred sorbent, the reaction sequence is believed to be:

$$CaCO_3 + > CaO + CO_2, \qquad (1)$$

and for local reducing conditions:

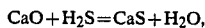  (2)

while, for local oxidizing conditions:

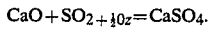  (3)

Since fuel-rich reducing conditions prevail in the core portion of the combustion zone, the reducing reaction (2) is favored. Good sulfur capture is realized when the temperature maintained in the core portion is within the range from about 2000° F. to 3000° F.

Larger droplets of liquid calcium sulfide are centrifuged to the wall of the primary combustor 14 and incorporated into the slag layer. This allows a substantial portion of the sulfur-bearing specie to be removed as slag with the other coal/ash mineral matter. Smaller sized droplets of liquid calcium sulfide may be carried out of chamber 14 into the slag-recovery plenum 16. Here, again, CaS may be absorbed in liquid slag flowing on the walls of chamber 16; thus, a relatively small portion of the sulfur originally found in the coal is carried with the gaseous products of combustion to their ultimate use location.

It is important to note that larger droplets of calcium sulfide are formed in the fuel-rich core portion where the reactants have a relatively long residence time. Thereafter, they are accelerated, centrifugally, through the annular region and become trapped in the liquid slag in a relatively short flight time to the walls. Overall this enhances conversion of the fuel's sulfur content to slag-bound calcium sulfide and minimizes subsequent conversion of its sulfates, which would tend to decompose and release sulfur dioxide.

In summary, retro-directed injector 54, co-operating with the relatively fuel-rich core portion of combustion zone 14, enables reaction of alkaline-earth sorbent with sulfur-bearing constituents of the gaseous products of combustion, under stoichiometric and temperature conditions that favor conversion to sulfides. These products readily dissolved in slag droplets, are thereby carried to the walls for disposal with the slag in an environmentally acceptable form.

It is desirable, as a clean-air objective, that the gaseous combustion products flowing to the end-use equipment be at least about 60% sulfur free. To that end, the molar amount of sorbent introduced exceeds twice the amount that would accomplish stoichiometric reaction of all the sulfur contained in the coal. Sorbent particle size is from about 0.5 to about 50, preferably from about 5 to about 15, microns. Suitable sorbents are alkaline-earth containing materials which, in addition to calcium, include magnesium, sodium and potassium. Calcium-containing compounds are best for economy of operation in that the reactions involve continually exposed surfaces of the introduced particle to form essentially a sponge having a great surface area for reaction with sulfur.

Since insufficient time is available for dead-burn to occur, surface diffusion of the reactants is required in order for reaction to occur. To the extent that the sulfur-compound products of reaction are absorbed by the slag, they are taken up as an isomorphous liquid, are soluble in the slag, and are processed as an essentially non-leachable ingredient. Being essentially permanently retained in the slag, the sulfur compounds are not exposed to oxidant at high temperature and, therefore, are unlikely to re-enter the stream of gaseous combustion product flowing to the ultimate end use.

The practice of the instant invention is applicable not only to low-pressure operations for the combustion of coal, but also for generating a high-temperature, high-velocity stream of gaseous combustion products for use in magnetohydrodynamic generators. In such magnetohydrodynamic systems it is highly desirable that the stream of gaseous combustion products from the combustor be highly ionized at temperatures in the range from 4000 degrees F. to about 5000 degrees F. To that end additives are frequently used to enhance ionization of the gaseous products. Where the present invention is applied to furnishing energy to a magnetohydrodynamic electric-power generating system, the additive to be used may be selected to serve both as a sulfur sorbent and on ionization promoter.

Figure 5:
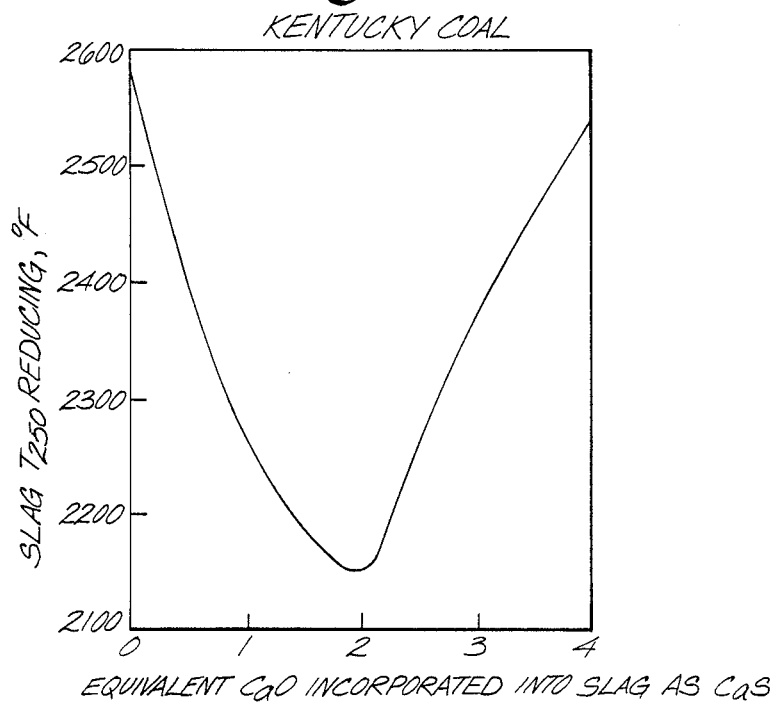
FIG. 5 illustrates the effect the sorbent has for reducing the temperature required to achieve a flowable slag at 250 poise.
Figure 6:
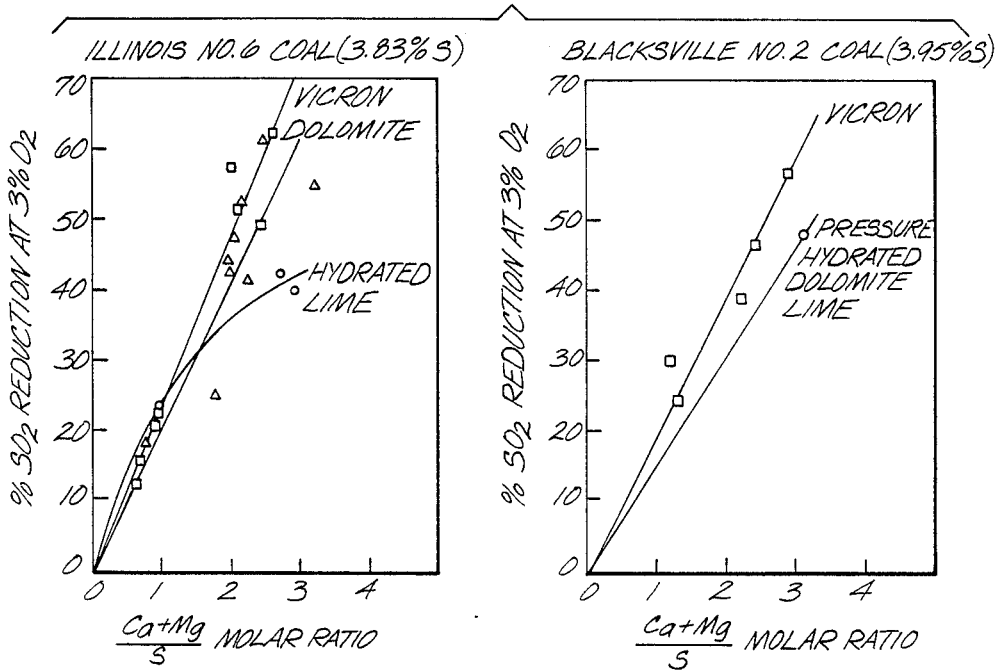
FIG. 6 shows $SO_2$ reduction for different sorbents as a function of molar ratio of Ca plus Mg to S, for two different coals.

The results shown in FIGS. 5 and 6 illustrate the use of limestone and other materials as sorbents for sulfur capture in accordance with the invention, for the coal specified.

FIG. 5 illustrates how the sorbent can reduce the operation temperature for good slag flow at 250 poise. Limestone was the sorbent employed. FIG. 6 shows the capacity of different sorbents for sulfur. Vicron is calcite.

Testing involved two typical eastern high-sulfur coals, Illinois No. 6 (3.63% S) and Blacksville No. 2 (3.05% S). Both were pulverized (70% thru 200 mesh) and fired. Four separate sorbent materials—Vicron, dolomite, hydrated lime, and pressure-hydrated dolomite lime—all pulverized to average particle sizes in the range of from 8 to 30 vicrons, were transported to the combustor as a dense phase flow in a carrier gas. In the range of (Ca+Mg)/S molar ratios of 2-3, SOx reduction values ranged from about 40% to 60% for Illinois No. 6 coal and Vicron or dolomite. The hydrated lime initially gave comparable results, but fell off as the (Ca+Mg)/S molar ratios increased. The data trends for Blacksville No. 2 coal and sorbents were similar but less pronounced, probably due to the 20% lower sulfur content in the coal.

What is claimed is:

1. A method for the combustion of particulate sulfur-containing carbonaceous fuel in a combustion zone and removing a major proportion of the sulfur from the gaseous products of combustion before the same leave the combustion zone, which method comprises in combination:

(a) introducing an oxidant at a temperature of from about 1200° to about 2000° F. tangentially into a combustion chamber having a fuel-injection nozzle extending from an end wall of said chamber into a combustion zone within said chamber, said oxidant being introduced tangentially and flowing substantially helically towards the end wall of said chamber and an apertured baffle positioned at the exit end of said chamber, said injection being at a velocity sufficient to form and maintain along a cylindrical wall between the end wall and apertured baffle a molten flowing slag layer along the surface thereof and resulting from combustion of the carbonaceous fuel, while simultaneously introducing to said combustion zone, through said nozzle, particulate carbonaceous material fluidized in a carrier fluid;

(b) combusting said particulate sulfur-containing carbonaceous material to yield molten slag and sulfur-containing gaseous combustion products;

(c) regulating the fuel and oxidant input velocities and mass-flow rates in a manner to maintain a relatively oxygen-rich annular region adjacent the cylindrical walls and a relatively fuel-rich recirculation zone within said annular region; and (d) injecting particulate sorbent, at a particle size of from about 5 to about 50 microns, into said recirculation zone co-current with the flow therein, and reacting said particulate sorbent with sulfur-containing combustion products to form a sulfur-containing compound, said sulfur-containing compound passing to, and being taken up by, said molten slag and;

(e) discharging products of combustion of reduced sulfur content from said primary combustion zone, and separately disposing of molten slag containing the sulfur-containing compound for collection external of said combustion zone.

2. A process as claimed in claim 1 in which the sorbent includes a calcium compound.

3. A process as claimed in claim 1 in which the sorbent includes a magnesium compound.

4. A process as claimed in claim 1 in which the gaseous combustion products include hydrogen sulfide.

5. A process as claimed in claim 1 in which the sorbent is selected from the group consisting of dolomite, calcite, lime and mixtures thereof.

6. In a method of combusting carbonaceous fuel and removing sulfur compounds from the gaseous products of combustion, the steps of:

(a) introducing carbonaceous fuel into a combustion chamber near the center of one end thereof;

(b) injecting a flow of preheated oxidizer into said chamber intermediate the ends thereof in a manner to produce a high velocity whirling flow field within said chamber adjacent the walls thereof and a lower-velocity, relatively fuel-rich core portion within said high-velocity flow field;

(c) independently regulating the input velocities and mass flow rates of said oxidizer and the injected fuel to maintain temperatures within said chamber substantially above the fusion temperature of slag so that substantially all of the non-combustible constituents of the fuel are centrifugally driven to the inner surfaces of said chamber in the form of droplets of molten slag;

(d) introducing sulfur-sorbent particulate into said fuel-rich core portion from a position near the center of the exit end of said chamber;

(e) reacting sulfur-bearing constituents of the gaseous products of combustion with said particulate sulfur-sorbent within said core portion under temperature and stoichiometric conditions favoring the reaction of hydrogen sulfide formed from sulfur-bearing constituents with said sulfur sorbent to produce sulfides;

(f) dissolving said sulfides in liquid slag before the slag is removed from the combustion chamber; and (g) separately removing liquid slag and high temperature gaseous combustion products from said chamber.

7. The method of claim 6 wherein the preheated oxidizer gas has a temperature of about 1200° to about 1800°.

8. The method of claim 6 wherein the fuel and oxidant are injected into the combustion chamber in a manner to maintain an annular region adjacent to the walls of the chamber which is oxygen rich with respect to the fuel-rich core portion within the high-velocity flow field.

9. The method of claim 6 wherein the walls of the chamber form a cylindrical wall and the preheated oxidizer gas is injected at a velocity sufficient to form a molten layer of slag along the surface of the cylindrical wall.

10. The method of claim 6 wherein the stoichiometry within the combustion chamber is about 0.7 to about 0.9.

11. The method of claim 6 wherein the sulfur-sorbent particle is an alkaline-earth containing material.

12. The method of claim 6 wherein the temperature maintained in the core portion is from about 2000° to about 3000° F.

* * * * *